United States Patent [19]

Suzuki et al.

[11] Patent Number: 5,191,441
[45] Date of Patent: Mar. 2, 1993

[54] IMAGE READING DEVICE

[75] Inventors: Kiyosuke Suzuki; Hideki Wanami, both of Saitama; Atsushi Shirata, Tokyo; Noboru Koyama, Kanagawa; Tatsuru Sato, Chiba, all of Japan

[73] Assignee: Sony Corporation, Tokyo, Japan

[21] Appl. No.: 502,188

[22] Filed: Mar. 30, 1990

[30] Foreign Application Priority Data

| Mar. 31, 1989 | [JP] | Japan | 1-083696 |
| Mar. 31, 1989 | [JP] | Japan | 1-083697 |
| Apr. 1, 1989 | [JP] | Japan | 1-083330 |

[51] Int. Cl.[5] .................................. H04N 1/393
[52] U.S. Cl. ........................... 358/451; 358/453; 358/444
[58] Field of Search .............. 358/54, 76, 214, 451, 358/453, 444; 340/721

[56] References Cited

U.S. PATENT DOCUMENTS

| 3,749,836 | 7/1973 | Hayami et al. . | |
| 4,364,084 | 12/1982 | Akimoto et al. | 358/54 |
| 4,435,723 | 3/1984 | Seimiya et al. . | |
| 4,635,108 | 1/1987 | Reeber et al. . | |
| 4,656,524 | 4/1987 | Norris et al. . | |
| 4,694,354 | 9/1987 | Tanaka et al. | 358/76 |
| 4,772,941 | 9/1988 | Noble . | |
| 4,814,885 | 3/1989 | Beard | 358/214 |
| 4,907,095 | 3/1990 | Komura et al. | 318/451 |
| 4,914,520 | 4/1990 | Beard | 358/214 |

FOREIGN PATENT DOCUMENTS

| 0285447 | 10/1988 | European Pat. Off. . |
| 3134705 | 4/1982 | Fed. Rep. of Germany . |
| 3149892 | 6/1982 | Fed. Rep. of Germany . |

OTHER PUBLICATIONS

"Experimental Test and Facsimile Integrated Work Station", 1982 Int'l. Zurich Seminar On Digital Communications, IEEE Catalog No. 82CH1735-0, Mar. 9-11, 1982, pp. 93-100.

Primary Examiner—Jin F. Ng
Assistant Examiner—Nina Tong
Attorney, Agent, or Firm—Hill, Van Santen, Steadman & Simpson

[57] ABSTRACT

An image reading device includes an image reading device, a video memory for reading the read image and a device for controlling the reading frequency, when the video data recorded in the video memory are repeated read, so that the reading frequency will be equal to the scanning frequency of the television signals. The image read by the line sensor may be converted in this manner into video signals by a simplified operation.

8 Claims, 10 Drawing Sheets

FIG.1
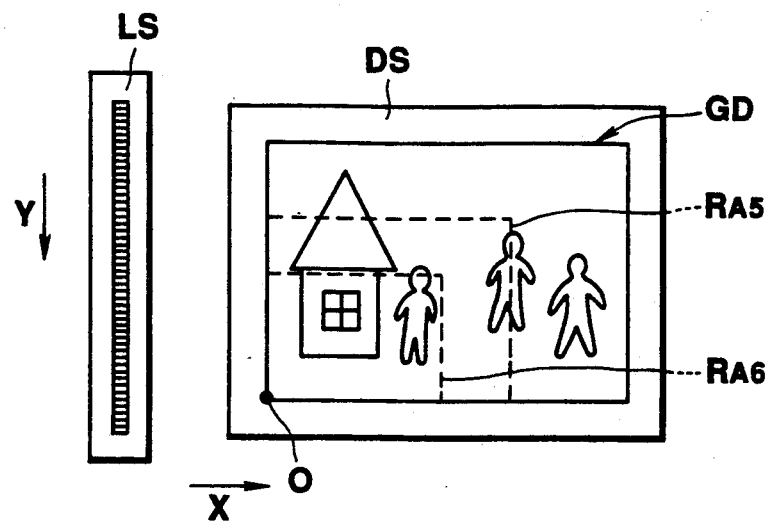
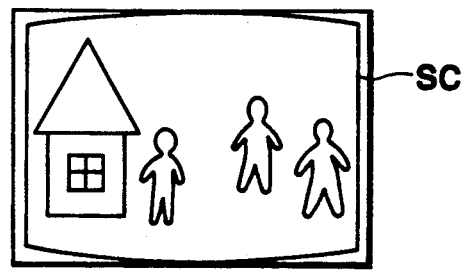
FIG.2(a)
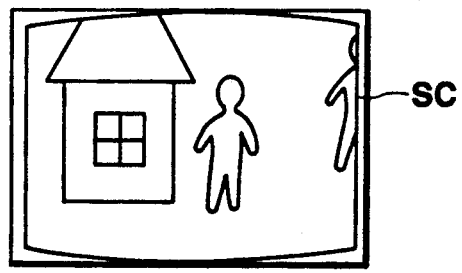
FIG.2(b)
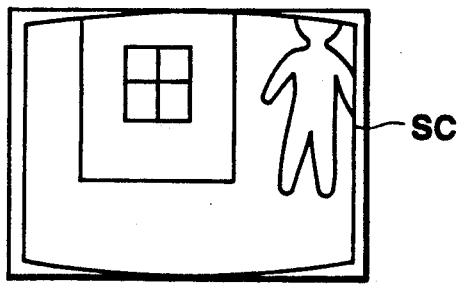
FIG.2(c)

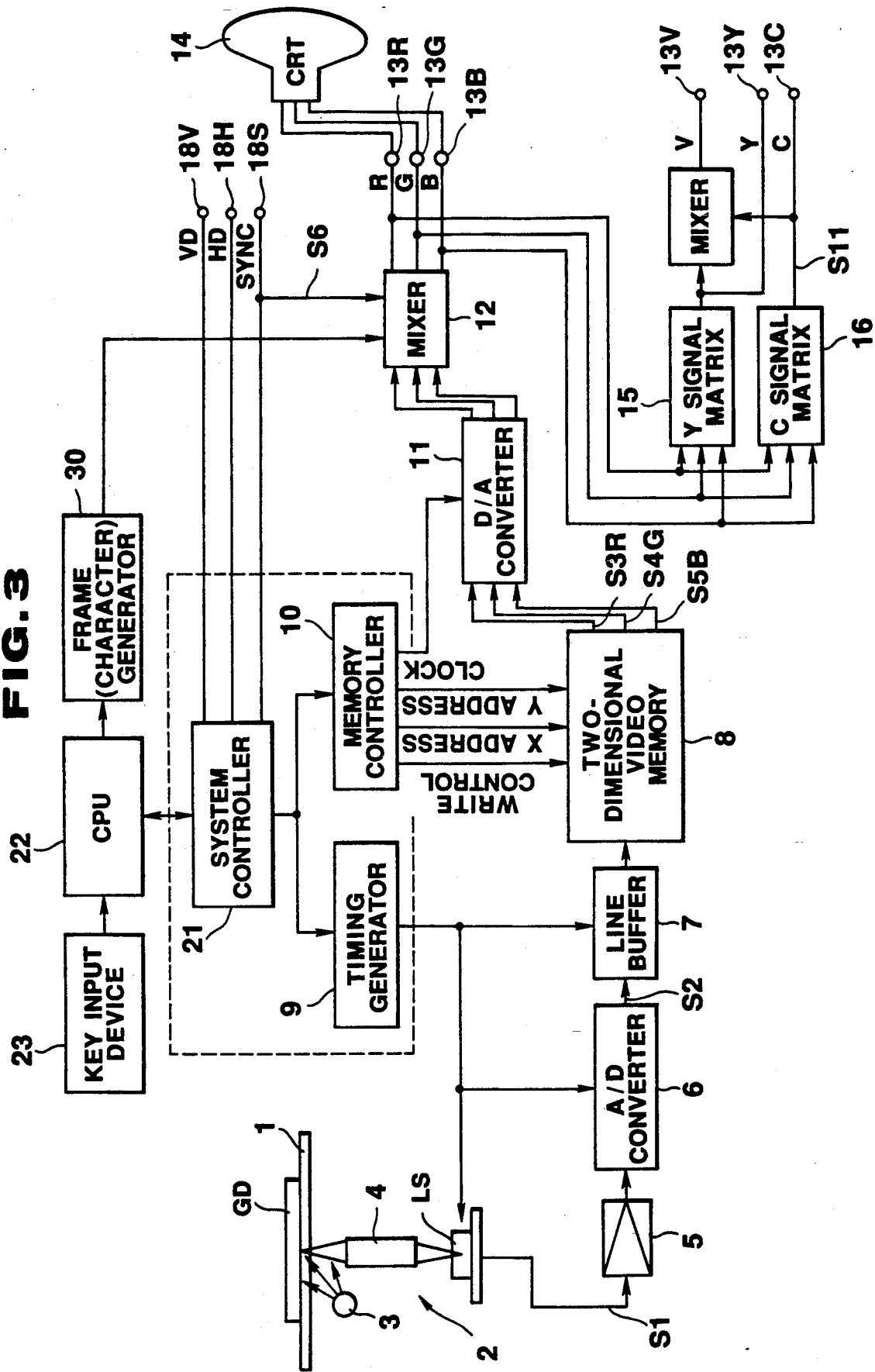

IMAGE READING DEVICE

BACKGROUND OF THE INVENTION

1. Field of the Invention

This invention relates to an image reading device and, more particularly, to an image reading device in which a read image is directly output to a monitor receiver, video printer, video tape recorder (VTR) or the like.

2. Description of the Prior Art

In the conventional image reading device, an original is scanned and read, using a line sensor, that is a one-dimensional or linear array of charge coupled devices or CCDs, and the read image signals are converted by an analog to digital (A/D) converter into digital video signals, which are then input via digital interface, such as GPLB, RS232C or SCSI, into a large capacity memory in computer for storage. When the stored image data are to be displayed on a monitor receiver or printed by a video printer, various signal processing operations are performed on the video data by a computer before the display or printing data are transmitted to the monitor receiver or video printer.

Therefore, when the video data read by the video reading device are simply displayed on the monitor receiver or printed on the video printer, a computer or the like processing device is necessitated. On the other hand, video data read from the video reading device are transmitted to the processing device, such as the computer, by a time-consuming operation, while it taken much time since the original is read until the read original is displayed on the monitor receiver.

In the conventional image reading device, if the enlargement ratio when the picture original of the JIS (Japanese Industrial Standard) size A-4 format is read and displayed on the full size screen of a display device, such as CRT monitor, is set to a standard enlargement ratio equal to 1, an A-5 or A-6 format region in the original, for example, may be displayed on the full-size screen of the display screen by changing this enlargement ratio.

It is now assumed that, as shown in FIG. 1, a picture original GD of a predetermined format is placed on an original table DS of the image reading device so that the lower left end of the original GD coincides with the origine 0 of the original table DS, the original GD is read by relative movement of the line sensor LS in the sub-scanning direction X with respect to the original GD, and the thus read video data are displayed on a display apparatus, such as CRT monitor. In such case, if the enlargement ratio of the image reading device is switched to, for example, 1, 2 and 4, indications are made on the display device, an shown on the display screen SC at (a), (b) and (c) in FIG. 2, respectively.

With the size of the picture original GD of FIG. 2 of, for example, A-4 format, the region of the overall A-4 format of the picture original GD is read when the enlargement ratio is "1", so that display is made on the overall surface of the display screen SC of FIG. 2(a). With the enlargement ratio of "2", a region $R_{A5}$ (A-5 format) of a similar figure portion with one half area of the area of the original GD with the origin 0 as the lower left end is read and displayed on the overall surface of the display screen SC of FIG. 2(b). With the enlargement ratio of "4", a region $R_{A6}$ (A-6 format) of a similar figure portion with one-fourth the area of the original GD with the origin 0 as the lower left end is read and displayed on the overall surface of the display screen SC of FIG. 2(c).

With the above described conventional image reading device, plural regions having sizes consistent with plural enlargement ratio are preset as the image reading range with the origin 0 of the original table DS as the lower left end. Since the original is read with the original placed in the reversed position on the original table, it is not grasped, until reaching the end of reading, what range of the original is being read. Also, since the image reading range on the original table is determined in dependence upon the selected enlargement ratio, it is not possible with the conventional device to read an arbitrarily selected portion of the picture original to display it after enlargement to a full screen size.

Although it is contemplated to designate the image reading range after shifting from the origin 0, the image reading range is determined by designating the reading start position from the origin 0 by units of millimeters, thus by the user's intuitive sense. It is also not apparent if the described portion of the original is being read until the original is actually read and the image displayed.

In the field of duplicators, there is known a technique of automatically setting the contracting or enlarging ratio of the duplicator (Japanese Patent Publication SHO-57-68868(1982)). This device is adapted to automatically set the contracting and enlarging ratio of the original documents of different sizes, but is not an image reading device in which the read image is directly displayed on the display device, while it is not adapted to read only a portion of the read image for display with an enlarged scale.

OBJECTS AND SUMMARY OF THE INVENTION

It is an object of the present invention to provide an image reading device which is free from the above mentioned inconveniences.

It is another object of the present invention to provide an image reading device in which video data read by the line sensor may be directly output on a monitor receiver or video printer in a short time, that is, with good response, without necessitating processing devices, such as computers.

It is a further object to provide an image reading device in which desired portions in the picture original may be read and in which the reading range may be determined easily and clearly with visual inspection of the display surface.

It is a further object of the present invention to provide an image reading device in which desired portions in the picture original may be read, a frame for determining the reading range may be displayed on the display screen and in which the frame may be generated, moved or changed in size by simplified construction.

The image reading device according to the present invention comprises image reading means, an image memory for recording the read image data and control means for controlling the reading frequency at the time of repeatedly reading the video data recorded on the video memory so as to be equal to the scanning frequency of television signals. It is possible with the above described arrangement to convert the image read by the line sensor into video signals by a simple operation and to repeatedly output the video signals to a monitor receiver, video printer or VTR, while it is also possible to directly display the image read by the line sensor on a monitor receiver in a short time or print or record the read image by a video printer or VTR.

According to another feature of the present invention the image data read from the picture original by image reading means are fetched into an image memory and the video data read from the image memory are mixed with an output signal from the reading range determining means to produce a display signal, while the image reading means is controlled by reading control means so that re-reading may be made within the range determined by the reading range determining means. This enables an arbitrary reading range on the picture original to be displayed to determine the image reading range easily and reliably.

According to a further feature of the present invention, function indication signal generating means for character-displaying the functions of the image reading device is used simultaneously as the reading frame determining means to enable the image reading frame to be determined easily and reliably by simple construction.

BRIEF DESCRIPTION OF THE DRAWINGS

FIG. 1 is a diagrammatic plan view showing the reading range of a picture original placed on an original table.

FIGS. 2a-2c are diagrammatic front views showing specific examples of the display forms on the display screen.

FIG. 3 is a block circuit diagram of an image reading device according to the present invention.

DESCRIPTION OF THE PREFERRED EMBODIMENT

Figure 4:
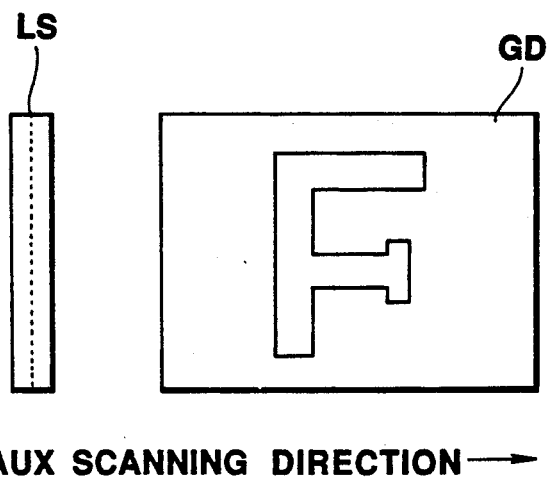
FIG. 4 is a diagrammatic view for illustrating the relation between the one-dimensional line sensor and the original.

FIG. 3 is a block diagram showing an embodiment of an image reading device according to the present invention.

In the image reading device, shown in FIG. 3, an image reading head 2 for reading as picture original GD, placed on an original table 1, is provided with a light source 3, a multiple lens array 4 and a CCD line sensor LS. The light source 3 irradiates the picture original GD with light and the light reflected from the original GD is received by the line sensor LS by way of the lens array 4. This line sensor LS is constituted by 1728 CCD light receiving cells arranged on a line. When reading a line of the original GD, the light source 2 sequentially emits the light corresponding to the three prime colors R, G and B to produce three prime color image signals in a line sequential manner. The output from the line sensor LS of the image reading head 2 is amplified by an amplifier 5 and transmitted to an A/D converter 6 for conversion into digital video data, which are then supplied, after timing matching by a line buffer 7 such as a FIFO (First In First Out) memory, to a video memory 8, such as RAM or dual port memory. The operation of the line sensor LS, A/D converter 6 and the line buffer 7 is controlled by a timing control generator from a reading timing control signal 9, while the operation of the video memory 8 is controlled by a control signal from a memory control circuit 10.

The light from the light source 3 is reflected by the original GD placed on the glass 1 and the reflected light is incident via lens array 4 or one-dimensional line sensor LS composed of plural CCDs placed on a straight line. Thus the operation equivalent to original reading by a duplicator is performed. The output signal from this one-dimensional line sensor LS, referred to hereinafter as pixel signal S1, is a three color signal for each pixel, that is, a red(R) signal, a green(G) signal and a blue(B) signal, and is supplied to amplifier 5 as line sequentailly switched signals. This pixel signal S1 is amplified in the amplifier 5 and converted in the A/D converter 6 into digital signals in the sequence of the R, G and B signals. These digitized signals are referred to as video data S2.

These video data S2 are supplied to the two-dimensional video memory 8 by way of the line buffer 7, which is constituted by, for example, a FIFO memory, and which is adapted for adjusting the output timing of the A/D converter 6 and the writing timing into the two-dimensional memory 8. The video data S2 supplied to the two-dimensional video memory 8 are recorded in predetermined memory cells by address signals supplied from the memory controller 10 as will be described subsequently.

From the video memory 8, the prime color data corresponding to the three prime colors R, G and B are read and transmitted to D/A converter 11, where they are converted into R, G and B analog video signals, which are then transmitted to a mixer 12. In this mixer, frame indication signals for determining the reading range are mixed into the analog video signals. These frame indicating signals are generated by a combination of character patterns constituting the frame by a so-called character generator or a CRT controller (CRTC), as will be explained subsequently in detail. The R, G and B video signals from the mixer 12 are taken out at output terminals 13R, 13G and 13B and transmitted to a display device, such as a color CRT monitor 14. The R, G and B signals from the mixer 12 are transmitted to a Y (luminance) signal matrix circuit 15 and to a C (chrominance) signal matrix circuit 16. The Y and C signals from these matrix circuits 15, 16 are taken out by way of output terminals 13Y, 13C, while being mixed in a mixer 17 into a composite video signal V which is taken out at an output terminal 13V.

The reading timing control circuit 9 and the memory control circuit 10 are controlled by a system controller 21 which exchanges data or control signals with a CPU 22. The system controller 21 and the CPU 22 may be formed into one circuit. A key input signal for determining the image reading range or switching the enlargement ratio is supplied from a key input device 23 to the CPU 22, which is responsive thereto to control a frame generator 30 to constitute a frame for indicating an image reading range by reading out from a ROM or by combining character patterns. The frame indicating signal from the frame generator 30 is supplied to the mixer 12 for mixing with the video data. The CPU 22 also controls the reading timing control circuit 9 via system controller 21 to re-read the thus determined image reading range in the picture original. When the character generator or CRT controller is used as the frame generator 30, this character generator is provided for displaying functions associated with various operations of the image reading device, and includes a character ROM in which alphabetical letter patterns, figure or numeral patterns and symbol patterns are stored. In addition, a frame indicating pattern is provided at a portion of the character generator.

From the system controller 21, horizontal sync signals HD, vertical sync signals VD and a composite sync signals SYNC, consisting of a mixture of these sync signals, are taken out via output terminals 18H, 18V and 18S.

Figure 5:
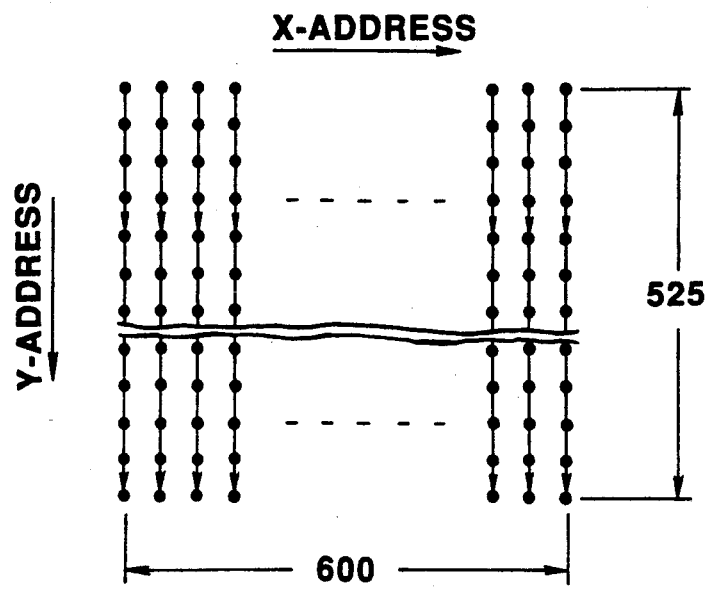
FIG. 5 is a diagrammatic view showing a two-dimensional image memory for illustrating the operating principle of recording video data read by the line sensor on a two-dimensional video memory.

The relation between video data S2 read by way of one-dimensional line sensor LS and A/D converter 6 and video data recorded in two-dimensional video memory 8 is explained by referring to FIGS. 4 and 5.

FIG. 4 shows the relation between the original GD and the one-dimensional line sensor LS. As shown therein, the CCDs of the one-dimensional line sensor are arranged linearly in the vertical direction of the drawing sheet and moved by a driver 80 from the left end to the right end of the original GD to sweep the original in its entirety. That is, the scanning is composed of a scanning in the main scanning direction and a scanning in the auxiliary scanning direction. FIG. 5 shows a memory map of the two-dimensional video memory 8. For the ensuring description, it is assumed that the standard television signals (video signals) of the so-called NTSC system are desired to be produced and that, as shown in FIG. 5, the number of pixels of the two-dimensional video memory is 600×525, for example, the x-axis direction is the X-address direction and the y-axis direction is the Y address direction.

Referring to FIG. 5, writing video data S2 into the two-dimensional video memory 8 is performed in the following manner. The video data obtained by the main scanning at the left side end of the original are sequentially recorded in memory cells disposed on the straight line at the left-hand end of the original in FIG. 5, while the Y-address is incremented by one for each recording in the memory cell. When the video data S2 are recorded in the totality of the memory cells disposed on the straight line at the left-hand side of the original GD, the one-dimensional line sensor LS is shifted one pixel towards right and the X-address is incremented by one simultaneously. The video data obtained by the main scanning are then sequentially recorded in the memory cells on the line designated by the X addresses, while the Y-address is incremented by one for each recording, in the same manner a described above. The recording operation of shifting the one-dimensional line sensor LS one pixel towards right at the same time that the X-address is incremented by one is continued until video data are recorded in the totality of the memory cells of the two-dimensional video memory 8 to terminate the writing operation. Meanwhile, the driving of the one-dimensional line sensor LS and the controlling of the A/D converter 6 and the line buffer 7 are controlled by the CCD driving timing generator 9. The X- and Y-addresses are controlled by the memory controller 10. The organization of the above mentioned two-dimensional video memory 8 may be realized, when the video data corresponding to the R, G and B signals are formed each by eight bits, for example, by a two-dimensional array of memory cells each of 24 bits per color pixel. As an alternative organization, 8-bit memory cells may be arranged in a two-dimensional array, with three memory cells of the array being superimposed along its depth.

The video data S2 thus recorded in the two-dimensional video memory 8 are controlled by the memory controller 10 so as to be read by the X- and Y-addresses before being transmitted to the D/A converter 11.

Figure 6:
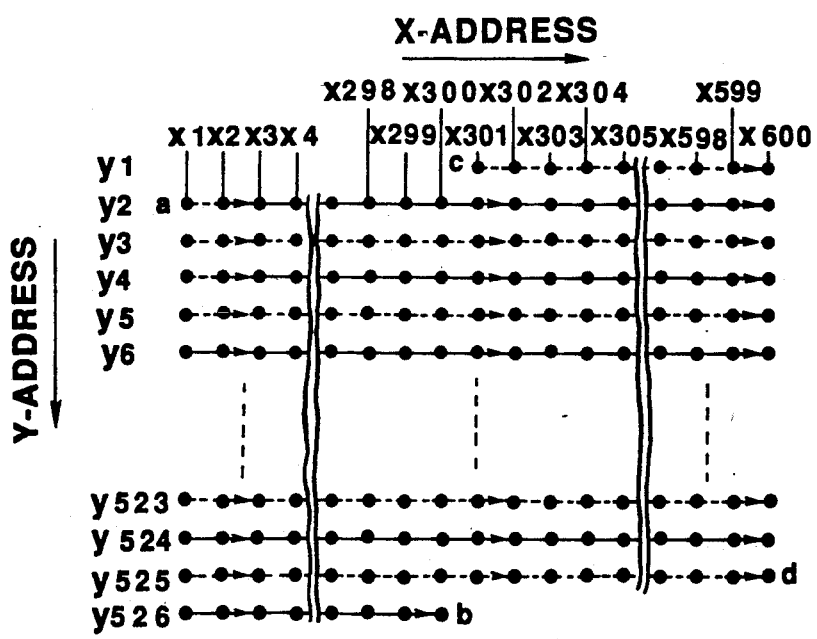
FIG. 6 is a diagrammatic view showing a two-dimensional image memory for illustrating the operating principle of reading video data from the two-dimensional video memory.

The reading operation of the two-dimensional video memory 8 is explained by referring to FIG. 6. In this figure, in distinction from the writing of the video data as mentioned previously, data are read in association with television signals. That is, in keeping with interlaced scanning, video data of the even-numbered field are sequentially read in the X-address direction, that is in the direction shown by solid-line arrows in FIG. 6, and the video data of the odd-numbered fields are sequentially read in the X-address direction, that is in the direction shown by broken-line arrows in FIG. 6. Thus the reading of the video data from the two-dimensional video memory is performed in the following manner.

The Y-address and the Y-address are started at $y_2$ and $x_1$ (shown at a in FIG. 6), respectively, to read the video data stored in the memory cell. Then, only the X-address is incremented by one sequentially and the video data recorded in the memory cells designated by the addresses are read sequentially. The reading operation with the Y-address remaining at the same value $y_2$ is continued until the X-address reaches $x_{600}$. Upon termination of the reading of the video data of the X-address $x_{600}$, the Y-address is incremented by two to $y_4$ while the X-address is reset to $x_1$. Reading of the video data, designated by $x_1$ to $x_{600}$ in the horizontal direction designated by the Y-address $y_4$ is performed while only the X-addresses are sequentially incremented by one. The above described reading under incrementing the Y-address by two each time is continued until the Y-address reaches $y_{526}$ and the X-address reaches $x_{300}$ (a position b in FIG. 6). When the reading of the video data for the Y-address $y_{526}$ and the X-address $x_{300}$ is terminated, the Y-address is set to $y_1$, while the X-address is incremented by one to $x_{301}$ (a position c in FIG. 6) to perform reading of the video data. Then, only the X-address is sequentially incremented by one and the video data recorded in the memory cells designated by these addresses are read. This reading operation is continued until the X-address reaches $x_{600}$. The Y address is incremented by two to $y_3$ while the X-address is reset to $x_1$ only the X-address is sequentially incremented by one and the video data, designated by $x_1$ to $x_{600}$, in the horizontal direction, designated by the Y-address $y_3$, are read. The above described reading operation, under incrementing the Y-address by two, is continued until the Y-address reaches $y_{525}$ and the X-address reaches $x_{600}$ (a position d in FIG. 6). After termination of reading of the picture data with the Y-address $y_{525}$ and the X-address $x_{600}$, the reading operation is again started at the above mentioned start point to repeat the above mentioned sequence of the reading operations. The reading of the video data from the position a to the position b of FIG. 6 represents the reading of the video data of the even-numbered field, while that of the video data from the position c to the position d represents the reading of the video data of the odd-numbered field, with the reading of an even-numbered field and an odd-numbered field constituting the reading of the video data corresponding to one frame or picture. The numbers of pixels designated by the Y-address $y_1$ and $y_{526}$ are each 300 such that the number of pixels 600×525 of the two-dimensional video memory 8 suffices.

The above X- and Y-addresses are controlled by the memory controller 10 and the video data reading frequency is controlled so as to be matched to the scanning frequency of the NTSC system television signals. For example, the incrementing period of the Y-address by two and the one-field reading period may be set to 63.556 μs (15.75 kHz) and 33.3667 ms (59.940 Hz), respectively, for conformity to the NTSC system.

On the other hand, the incrementing period of the Y-address by two and the one-field reading period may be set to 64 μs (15.625 kHz) and 40 ms(25 Hz , respectively, for conformity to the PAL system. In this case, the memory cells in the X-address direction should be designed to meet with 625 pixels. If the number of the memory cells in the X-address direction is insufficient to meet with the 625 pixels, video data for the excess pixels should be blank signals. The incrementing period of the Y-address by two and the one-field reading period may also be set to 29.6296 μs(3.3750 kHz) and 33.333 ms (30 Hz), respectively, for conformity to the high vision standard.

The video data, video data S3 for red (R) signals, video data S4 for green (G) signals and video data S5 for blue (B) signals thus read are supplied to the D/A converter 11, as shown in FIG. 3, for conversion into analog signals. These analog signals are mixed in the mixer 12 with composite sync signals S6 from system controller 21 to form three prime color signals, namely the red signals R, green signals G and blue signals B, mixed with sync signals. These color signals are supplied to output terminals 13R, 13G, 13B, Y signal matrix 15 and C signal matrix 16. In the Y signal matrix 15, luminance signal Y is generated from the red signals R, green signal G and blue signal B. This luminance signal Y is supplied to the mixer 17 and to the output terminal 13Y. In the C signal matrix 16, chrominance signal C is generated from the red signal R, green signal G and the blue signal B. This chrominance signal C is supplied to the mixer 17 and to the output terminal 13C. In the mixer 17, a composite video signal is generated in the mixer 17 from the luminance signal Y and chrominance signal C so as to be supplied to output terminal 13V. The R, G and B signals are output at output terminals 13R, 13G and 13B, respectively, so as to be transmitted directly to, for example, a monitor receiver. The composite video signal is output at output terminal 13V, and the composite video signals are separated into Y and C components and output at output terminals 13Y, 13C, before being transmitted to video equipment, such as monitor receiver video printer or VTR.

The CCD driving timing generator 9 and the memory controller 10 are controlled by system controller 21. From system controller 21, so-called V sync signal VD, H sync signal HD and composite sync signal SYNC are transmitted at output terminals 18V, 18H and 18S, respectivley.

In this manner, by providing a video memory in the video reading apparatus itself for recording video data read by the line sensor and by repeatedly reading the recorded video data at the same frequency as the scanning frequency of the television signal to transmit the video signals, it becomes possible to transmit video signals directly to various video equipment, such as monitor receiver, video printer or VTR. Thus it becomes possible to display the read data directly on a monitor receiver in a short time, print or record the data on a video printer or VTR, without necessitating a large capacity memory or computer for video data processing.

The present invention is not limited to the above embodiment and the reading period for each field may be 50 to 12.5 ms (20 Hz to 80 Hz).

Figure 7:
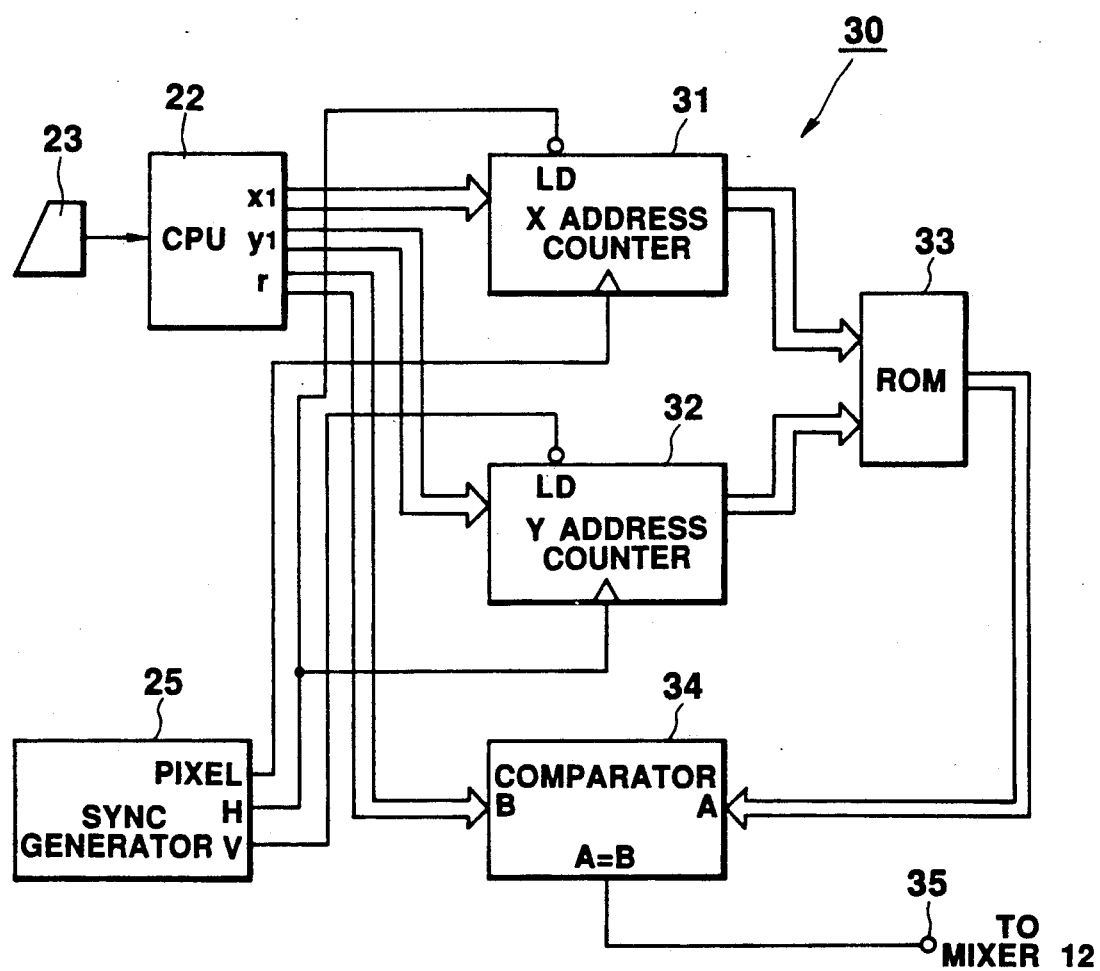
FIG. 7 is a block circuit diagram showing a specific example of a frame generator of the above embodiment.

An example of a specific construction of the frame generator 30 is shown in FIG. 7.

In this figure, with the key input signal from the key input device 23 being transmitted to the CPU22, the CPU22 outputs reading range determining frame display position data (X-coordinate $x_1$ and Y-coordinate $y_1$) and enlargement ratio designating data r and transmits the data $x_1$ to a data input terminal of an X address counter 31, the data $y_1$ to a Y-address counter 32 and the enlargement ratio designating data r to a comparator 34. Although the key input may be directly input to the coordinate data, it is also possible to determine the position while the frame is moved in the X-Y direction or in the in the oblique direction on the display screen using a cursor shift key. To clock input terminal and load control terminal LD of the X-address counter 31 are supplied pixel clocks and horizontal (H) sync signals from sync generator 25 in the system control circuit 21, respectivley. To clock input terminal and load control terminal LD of the Y-address counter 32 are supplied H sync signals and V(vertical) sync signals from sync generator 25, respectively. Count outputs from X-address counter 31 and Y-address counter 32 are supplied to X- and Y-address terminals of ROM 33, respectivley. Frame display data as shown for example in Table 1 are written in ROM 33.

TABLE 1

| | | X address (lower 8 bits) | | | | | | | | | | | |
|---|---|---|---|---|---|---|---|---|---|---|---|---|---|
| | | 00 | 01 | 02 | 03 | 04 | 05 | 06 | 07 | FC | FD | FE | FF |
| Y | 00 | 0 | 0 | 0 | 0 | 0 | 0 | 0 | 0 | 0 | 0 | 0 | 0 |
| address | 01 | 0 | 1 | 1 | 1 | 1 | 1 | 1 | 1 | 1 | 1 | 1 | 0 |
| (upper | 02 | 0 | 1 | 2 | 2 | 2 | 2 | 2 | 2 | 2 | 2 | 1 | 0 |
| 8 bits) | 03 | 0 | 1 | 2 | 3 | 3 | 3 | 3 | 3 | 3 | 2 | 1 | 0 |
| | 04 | 0 | 1 | 2 | 3 | 4 | 4 | 4 | 4 | 3 | 2 | 1 | 0 |
| | 05 | 0 | 1 | 2 | 3 | 4 | 5 | 5 | 5 | 3 | 2 | 1 | 0 |
| | 06 | 0 | 1 | 2 | 3 | 4 | 5 | 6 | 6 | 3 | 2 | 1 | 0 |
| | 07 | 0 | 1 | 2 | 3 | 4 | 5 | 6 | 7 | 3 | 2 | 1 | 0 |
| | 08 | 0 | 1 | 2 | 3 | 4 | 5 | 6 | 7 | 3 | 2 | 1 | 0 |
| | 09 | 0 | 1 | 2 | 3 | 4 | 5 | 6 | 7 | 3 | 2 | 1 | 0 |

TABLE 1-continued

| | X address (lower 8 bits) | | | | | | | | | | |
|---|---|---|---|---|---|---|---|---|---|---|---|
| | 00 | 01 | 02 | 03 | 04 | 05 | 06 | 07 | FC | FD | FE | FF |
| 0A | 0 | 1 | 2 | 3 | 4 | 5 | 6 | 7 | 3 | 2 | 1 | 0 |
| FA | 0 | 1 | 2 | 3 | 4 | 5 | 5 | 5 | 3 | 2 | 1 | 0 |
| FB | 0 | 1 | 2 | 3 | 4 | 4 | 4 | 4 | 3 | 2 | 1 | 0 |
| FC | 0 | 1 | 2 | 3 | 3 | 3 | 3 | 3 | 3 | 2 | 1 | 0 |
| FD | 0 | 1 | 2 | 2 | 2 | 2 | 2 | 2 | 2 | 2 | 1 | 0 |
| FE | 0 | 1 | 1 | 1 | 1 | 1 | 1 | 1 | 1 | 1 | 1 | 0 |
| FF | 0 | 0 | 0 | 0 | 0 | 0 | 0 | 0 | 0 | 0 | 0 | 0 |

Output data from ROM 33 into which these data area written are supplied to a comparison input terminal A of comparator 34 for comparison with the enlargement ratio designating data r from CPU22 supplied to comparison input terminal B. When input data from terminals A and B are equal (A=B), the comparator 34 generates a predetermined level output which is supplied via terminal 35 to the mixer 12. The output from terminal 35 represents the above mentioned frame display signal.

As an example, when the X-coordinate $x_1$ and the Y-coordinate $y_1$, which represent the frame display position data for determining the read range from CPU22 of FIG. 7, are both zero and the enlargement ratio designating data r is zero, the X-address counter 31 starts counting from zero each time the H sync signal is input, while the Y-address counter 32 starts counting from zero each time the V sync pulse is input. Thus the ROM data in Table 1 are output substantially in this form. Since the enlargement ratio designating data r is zero, the output of a predetermined level, such as white level, is output from comparator 34 to terminal 35 when the vale of the ROM data of Table 1 is zero. Since this output signal is a signal which displays white level at the zero position of ROM data of Table 1, it is the white frame having the form corresponding to the "zero" portions of the ROM data of Table 1 that is displayed on the display screen. By switching the enlargement ratio designating data r to another value, such as four, the white frame having the shape corresponding to the "four" portions of ROM data of Table 1 is displayed, as a result of which the size of the display frame is modified. By changing the display position data $x_1$, $y_1$, the X-address count start value for each entry of the H sync pulse input and the Y-address count start value for each entry of the V sync pulse input are changed to modify the frame display position on the display screen.

Figure 8:
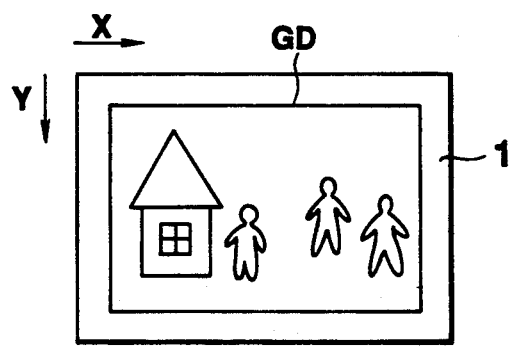
FIG. 8 is a diagrammatic plan view showing the relation between the picture original and the original table.
Figure 9A:
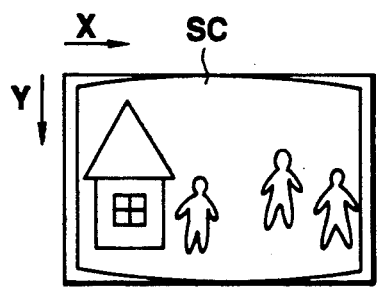
FIGS. 9a-9c are diagrammatic front views showing specific examples of display forms on the display screen.
Figure 9B:
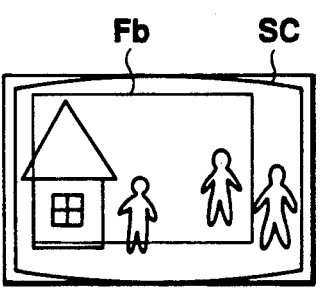
Figure 9C:
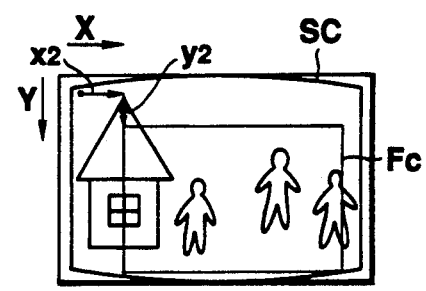
Figure 9D:
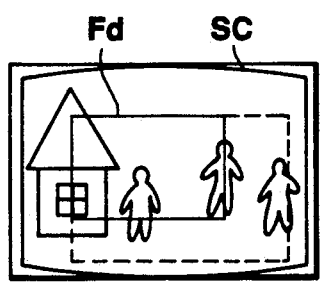
Figure 9E:
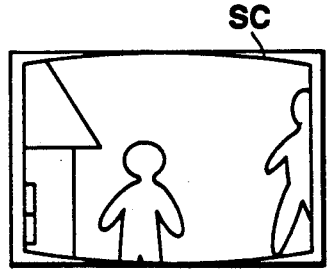

The above operation is explained by referring to FIGS. 8 and 9.

FIG. 8 shows the picture original GD of a predetermined format, such as A-4 format, placed on the original table 1. In the standard mode (enlargement ratio of 1), the overall surface of the video original GD is fully displayed as shown at (a) in FIG. 9. If a desired enlargement ratio is set in this state by a key input by the key input device 23 to select the frame display mode, a frame Fb shown at (b) in FIG. 9 is displayed on the display screen SC. Then, by actuating a cursor shift key or joystick of the key input device 23, a display position data are charged, such that, as shown at (c) of FIG. 9, a frame Fc which is shifted $x_2$ in the X-direction or $y_2$ in the Y-direction is displayed on the display screen SC. If a modified enlargement ratio is set by key entry, the frame format is changed as shown at (d) in FIG. 9. After the reading range frame Fd is determined by this sequence, the image reading operation is performed, in such a manner that the image reading head 2 is controlled with respect to reading by means of system controller 21 and read timing control circuit 9 from CPU22 for re-reading the range indicated by the frame Fd in the image original GD by the image reading head 2. As a result, the original portion within the range of the frame Fd shown at (d) in FIG. 9 is again read and enlarged so as to be displayed fully on the display screen SC.

Considering that the line sensor LS has 1728 photocells, and the resolution in the Y or vertical direction of the ordinary CRT monitor display screen SC is about 480 lines, the photocells may be put out of use at a rate of one of four cells when the full format (A4 format) original is to be displayed on the display screen. When the ¼ size area is to be read and displayed to an enlarged scale, it may be read by the same line sensor LS with sufficient resolution. Taking into account the deterioration in resolution in case of displaying only a partial region of video data read from a original and stored in the video memory, an obvious advantage may be derived from re-reading the video original itself.

With the above described embodiment of the present invention, since the reading range determining frame F is displayed on the display screen SC, such as CRT monitor, the read range for the picture original GD may be determined easily and reliably, while the position of the frame as well as the enlargement ratio is checked simultaneously.

By selecting a frame display color other than white color, and setting the condition of comparison at the comparator 34 to, for example, A<B, an output of a predetermined level is output from comparator 34 within a range in which the value of the ROM data of Table 1 is not more than r. This output signal is at a predetermined level output the above mentioned reading range, and may be mixed with the video data signal to display the range outside the reading range by blank or halftone display. With blank display, the range outside the reading range is colored in one predetermined color, so that it becomes difficult to ascertain the position in the original. With halftone display, the range outside the reading range is displayed in light to dark or medium tone to facilitate recognition of the reading position in the original.

Figure 10:
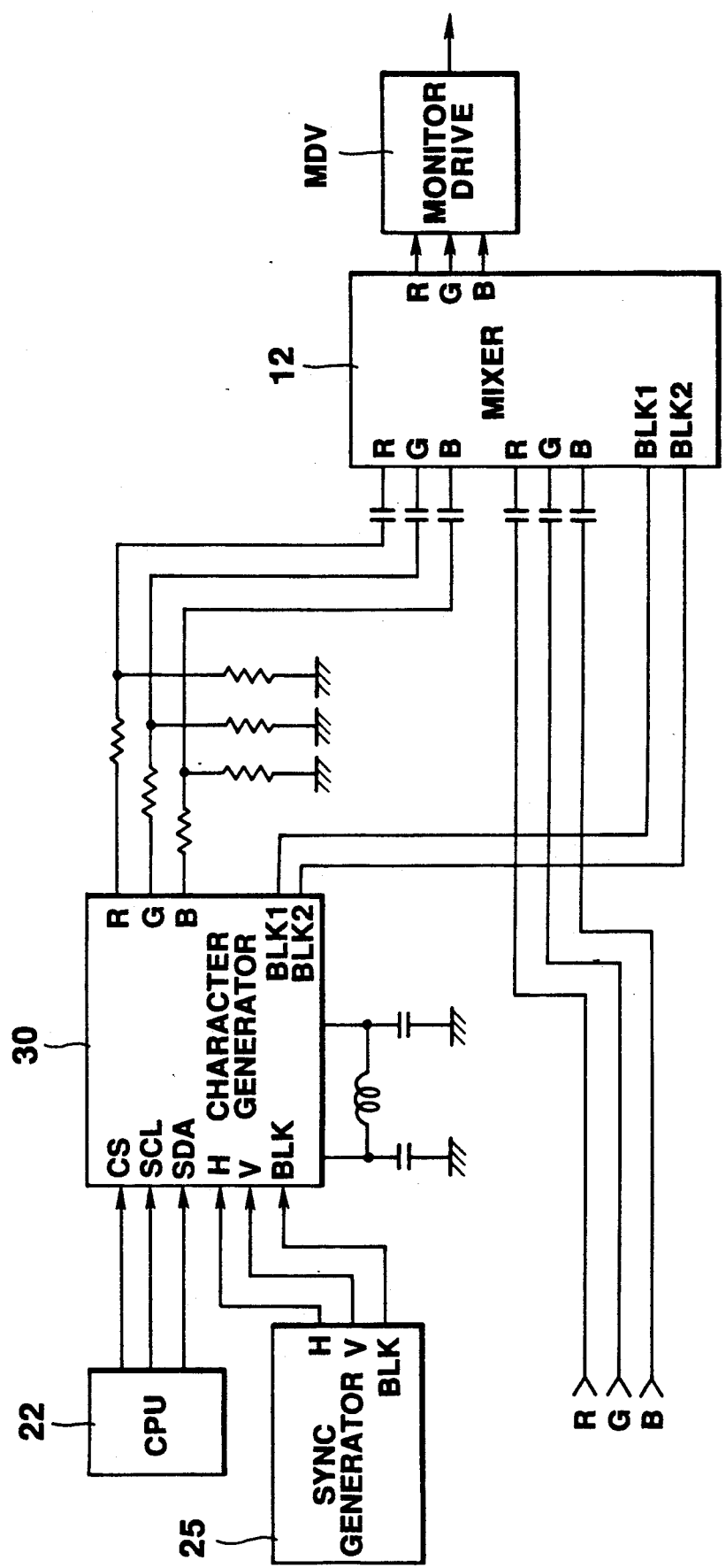
FIG. 10 is a block circuit diagram showing a specific example of peripherals of a character generator of the above embodiment.

FIG. 10 shows an example of a peripheral circuit when the character generator is used simultaneously as the frame generator 30.

In FIG. 10, an active signal (chip select signal) CS, a clock signal SCL and data signals SDA are transmitted from CPU22 to character generator 30. Responsive to these signals, character patterns stored in ROM of character generator 30 are designated and read. This reading operation is controlled in timing in accordance with horizontal sync signal H, vertical sync signal V and blanking signal BLK so that R, G and B signals, for example, are output and transmitted to mixer 12. A superimposing IC, for example, is used as the mixer 12, the output of which is mixed with video signals R, G and B read from video memory 8 and transmitted by way of monitor driving circuit MDV to CRT monitor 14.

Referring to FIGS. 11 to 16, more specific examples of character patterns stored in ROMs in the character generator 30 and the display form are explained.

Figure 11:
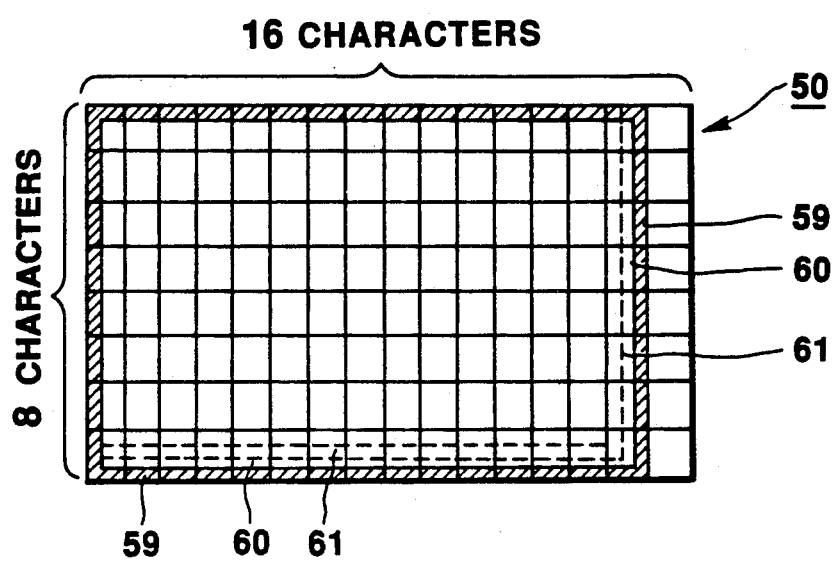
FIGS. 11 to 16 are diagrammatic views showing specific examples of display forms of the reading frame by the display table and the frame display character pattern.

FIG. 11 illustrates a specific example of the character display table. When a mixed signal with the character display signal is displayed on the display screen, a display table 50 consisting of an array of 128 characters formed by 16 characters in the horizontal direction and 8 characters in the vertical direction is displayed within a predetermined size region on the display screen SC shown in FIG. 16. Character patterns, such as alphabetical letters or numerals, are segmentially arranged at predetermined positions on the character display table 50 for displaying various functions of the video reading device.

Figure 12:
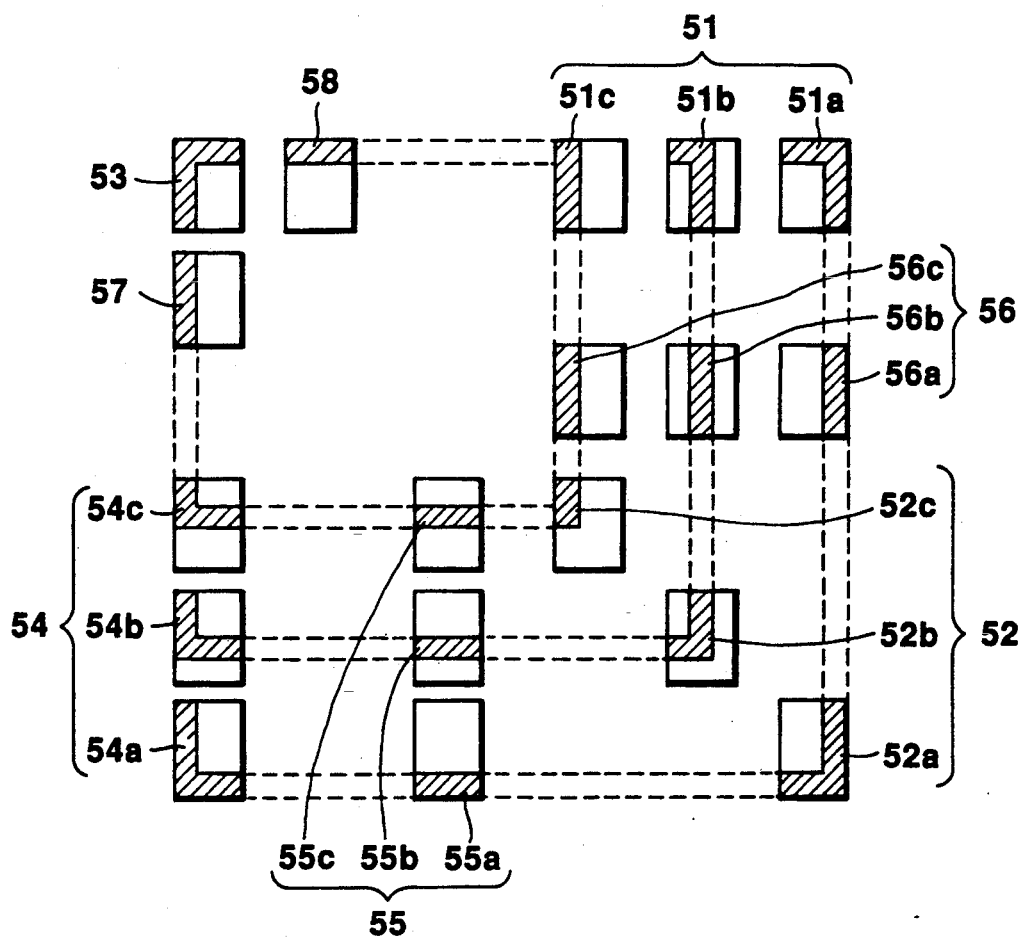

In the present embodiment, a character pattern 51 forming the upper right corner of the video reading range, a character pattern 52 forming its lower right corner a character 53 forming its upper left corner, a character pattern 54 forming its lower left corner, a character pattern 55 forming its bottom side, a character pattern 56 forming its right side, a character pattern 57 forming its left side and a character pattern 58 forming its upper side, as shown in FIG. 12, are stored in the character ROM of the character generator 30, besides the general character patterns, such as the alphabetical letters. These character patterns are read and combined to form and display the reading range determining frame as shown at 59, 60 and 61 in FIG. 11.

Figure 13:
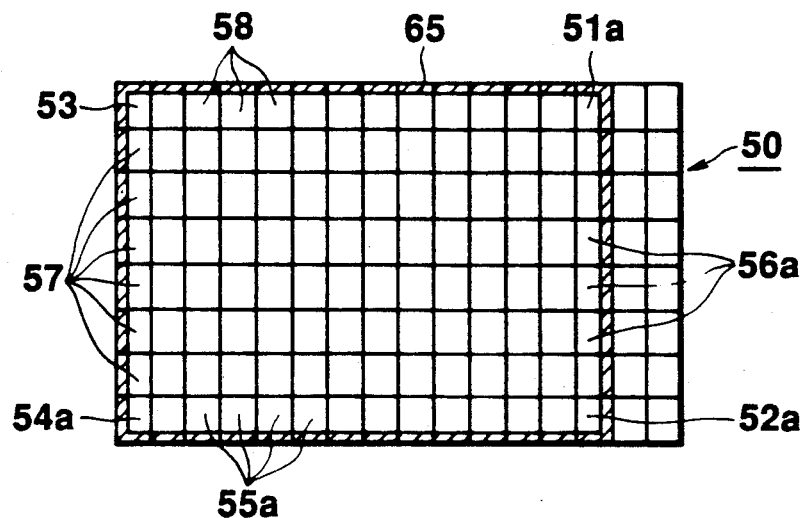
Figure 14:
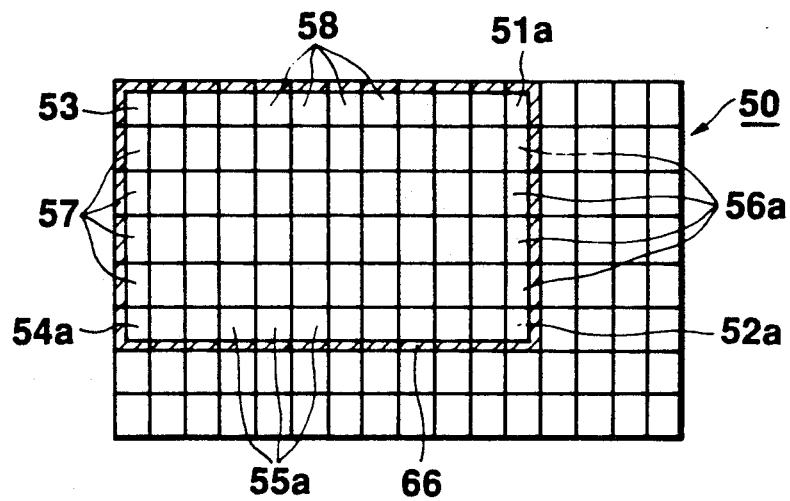
Figure 15:
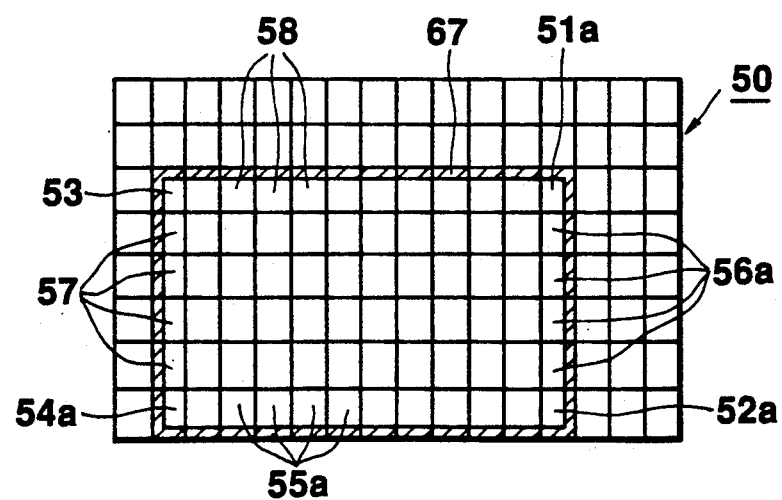
Figure 16:
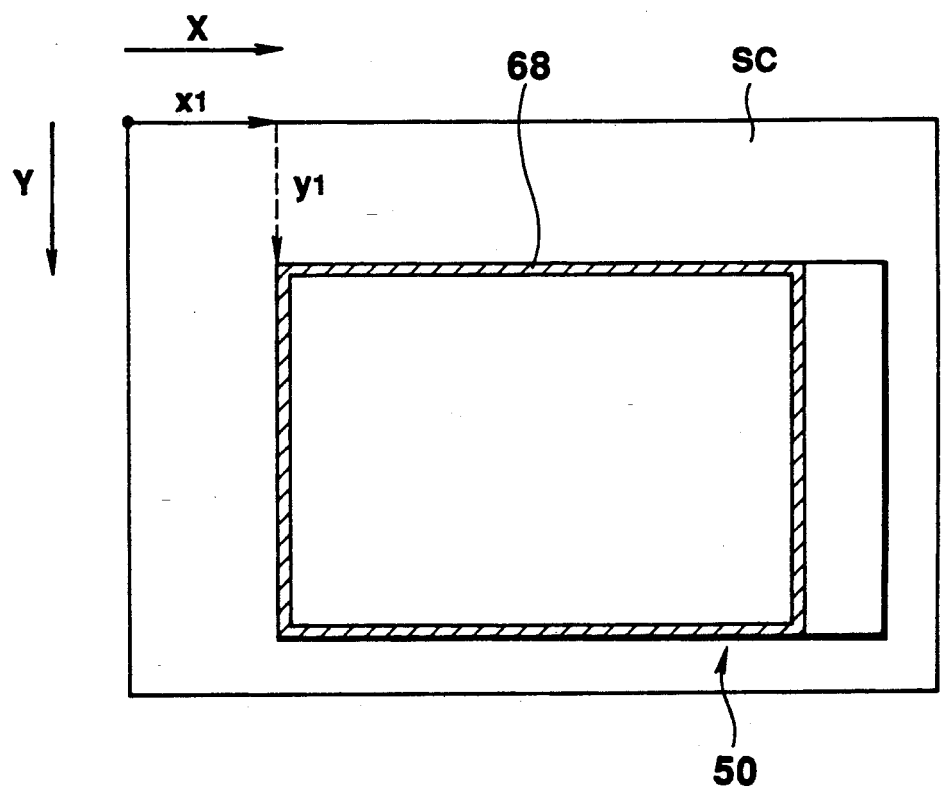

The four corners of the reading range determining frame 59 shown in FIG. 11 may be displayed by reading the character patterns 51a, 52a, 54a, 53 shown in FIG. 12, while its four sides may be displayed by rereading necessary lengths from character patterns 57, 58, 56a and 55a. When using these eight kinds of the character pattern, the frame display position and size may be changed by modifying the allocating position in the character display table 50, as shown in FIGS. 13 to 15. Thus, by reading the eight kinds of the character patterns 53, 57, 54a, 55a, 52a, 56a, 51a and 58 in FIG. 12 so that these patterns are arranged at predetermined positions of the display table 50, and by allocating the character patterns for displaying the right sides 51a, 56a, 52a with shift of two characters towards left on the display table 50 and the character patterns for displaying the bottom side with shift of two characters towards above, with the reading range determininig range 65 displayed as shown in FIG. 13, it becomes possible to display the small size reading range determining frame 66 as shown in FIG. 14. On the other hand, by displaying the frame 66 shown in FIG. 14 as a whole towards left by one character and towards below by two characters, the reading range determining frame 67 shifted as shown in FIG. 15 may be displayed.

While the above is concerned with character-by-character shifting and change in size or format, the number of kinds of the character patterns for frame display may be increased to realize finer frame format modification and movements. Thus the reading range determining frames 59 to 61 are able to display the four corners by reading character patterns 51b, 52b, 54b and 53 shown in FIG. 12 and to display four sides by reading necessary lengths of the patterns 57, 58, 56b and 55b. On the other hand, the reading range determining frame 61 is able to display four corners by character patterns 51c, 52c, 54c and 53 and to display four sides by the patterns 57, 58, 56c and 55c. By combining different character patterns in this manner, the reading range determining frame of desired size can be formed and displayed. Movement of the reading range determining frame can be realized more finely than in the case of character-by-character movements.

The reading range determining frame may also be moved by changing the display position of the character display table 50. That is, in the display position of character display table 50, for example, the upper left X and Y coordinates $x_1$, $y_1$ on the display screen SC of FIG. 16, can be changed by character generator 30, the frame 68 displayed in the table 50 may be moved concomitantly by changing the position of the character display table 50 on the display screen SC.

In the present embodiment, a character pattern of 12 horizontal dots and 16 vertical dots is used and the character display table 50 of 192 dots by 16 horizontal characters and 256 dots by 8 vertical characters is formed. Each horizontal dot of the character is read by 5 kHz clock and each dot along the vertical direction corresponds to each scanning line of the display screen SC of the CRT monitor 14. Therefore, the display screen SC as a whole is formed by about 250 dots (5 kHz clock) in the horizontal direction and by 480 dots in the vertical direction (effective display screen of 480 lines) and the display table 50 of 152 dots × 256 dots is movably displayed on the display screen SC.

With the above described embodiment of the image reading device of the present invention, the frame for determining the re-reading range is displayed in superposition during the time when the overall surface of the picture original is read and displayed. If the frame is moved or modified in size and the reading range is determined under visual inspection to effect re-reading the portion of the frame in the video original is displayed to an enlarged scale on the overall display screen SC. This technique is known as trimming.

Considering that the line sensor LS has 1728 photocells, and the resolution in the Y or vertical direction of the ordinary CRT monitor display screen SC is about 480, the photocells may be put out of use at a rate of one of four cells when the full format (A4 formed) original is to be displayed on the display screen. When the ¼ size area is to be read and displayed to an enlarged scale, it may be read by the same line sensor LS with sufficient resolution. Taking into account the deterioration in resolution in case of displaying only a partial region of video data read from the original and stored in the video memory, an obvious advantage may be derived from re-reading the video original itself.

The standard reading range of the image reading device of the present embodiment is the A-4 format placed transversely. When it is desired to display the picture original, which is vertically elongated and placed horizontally or transversely in the vertical position, the upper half of the A-4 format original is displayed fully as the scrolling function. A function is added in which, when an UP key of an UP/DOWN key of the key input device is actuated in this state, an upward scrolling is performed with 2-line (2H) step movement. In this scrolling function, the DOWN key in the initial state is not accepted but both the UP and DOWN keys are accepted after scrolling.

The illustration of these functions are displayed on the screen by the character generator 30 under control from CPU22. When trimming is attempted after trimming, a display "TRIMMING ONCE ONLY" is made to indicate that re-trimming is not feasible. There are also displayed "NO TRIMMING IN SCROLL MODE" indicating that trimming is not feasible during scroll mode, and error messages such as no trimming during superimposition, format cannot be changed during scroll mode, superimposition is not feasible during scroll mode, trimming frame color cannot be changed, or no trimming after reading the minimum format original. Display of the reading format, such as "size n" at the time of changing the reading range format, is also made by character generator 30 under control from CPU22.

With the above described embodiment of the present invention, the reading range determining frame is displayed on the display screen SC, such as CRT monitor, the reading range for the picture original GD may be easily and positively determined as the position or enlargement ratio of the frame F is checked. The character generator 30 for function display is used as the arrangement for frame display so that the display frame can be formed under control from the CPU22 by a software technique, that is without addition of hardware components.

The present invention is not limited to the above embodiments, but encompasses various modifications. For example, the frame can be displayed in desired tints, such as white or black tints.

We claim:

1. A scanning apparatus for reading an image comprising:
   a line sensor for reading analog image data corresponding to the image of an original;
   an analog-digital converter for converting said image data from analog data into digital image data;
   memory means for storing said digital image data;
   a memory controller for generating address signals for storing said digital image data into said memory means;
   a timing signal generator for controlling said line sensor;
   control means connected to said memory controller and to said timing signal generator, for controlling the reading frequency from said memory means so as to be equal to the scanning frequency of a television signal;
   a digital-analog converter for converting said digital image data into image data as television signal data corresponding to said original image;
   an output terminal for outputting said image data as television signal data; and
   said line sensor and said digital-analog converter operating asynchronously.

2. A scanning apparatus for reading an image according to claim 1, wherein said memory controller is controlled by a system controller so as to read out said image from said memory means corresponding to an odd-numbered field of a television signal during a first period, and an even-numbered field of a television signal during a second period, said first and second periods being generated repeatedly in accordance with an interlace form of television system.

3. A scanning apparatus for reading an image comprising:
   a scanning sensor for reading an image of an original document and producing an image signal in response thereto;
   memory means for storing said image signal read by said scanning sensor;
   a frame image signal generator for generating a frame image signal defining a trimming area relative to said stored image signal;
   mixing means for reading said stored image signal from said memory means and mixing said stored image signal with said frame image signal;
   an output terminal for outputting a signal mixed by said mixing means as a displaying image signal; and
   a control keyboard for controlling said frame image signal generator, to control the size and position of said trimming area on said image signal.

4. A scanning apparatus for reading an image according to claim 3, including driving means for moving said scanning sensor, control means for controlling said driving means so as to scan and read again and store in said memory means an area of said document corresponding to an area of said image signal within said trimming area determined by said frame image signal generator and said control keyboard.

5. A scanning apparatus for reading an image according to claim 3, including a character generator for displaying a function of the apparatus, said character generator also being used as said frame image signal generator.

6. A scanning apparatus for reading an image according to claim 3, wherein an area of said image signal determined by said frame image signal is magnified and stored in said memory means displayed on the whole of display area of display means.

7. A scanning apparatus according to claim 3, wherein said control keyboard includes a trimming area positioning key which moves said frame image on said image signal, and relative to said stored image signal.

8. A scanning apparatus according to claim 3, wherein said control keyboard includes a trimming area magnifying key which magnifies and reduces said trimming area on said image signal.

* * * * *